United States Patent [19]
Schuler

[11] Patent Number: 5,220,260
[45] Date of Patent: Jun. 15, 1993

[54] ACTUATOR HAVING ELECTRONICALLY CONTROLLABLE TACTILE RESPONSIVENESS

[75] Inventor: Chester L. Schuler, Sudbury, Mass.

[73] Assignee: Lex Computer and Management Corporation, Keene, N.H.

[21] Appl. No.: 783,635

[22] Filed: Oct. 24, 1991

[51] Int. Cl.$^5$ .............................................. G05B 13/00
[52] U.S. Cl. ..................... 318/561; 318/601; 318/652; 318/687; 360/14.1
[58] Field of Search ................. 360/14.1, 14.3; 318/560, 561, 637–638, 600, 569, 601, 615–616, 646, 652, 687

[56] References Cited
U.S. PATENT DOCUMENTS

| | | | |
|---|---|---|---|
| 4,538,188 | 8/1985 | Barker et al. | 360/14.3 |
| 4,685,003 | 8/1987 | Westland | 360/14.1 |
| 4,729,044 | 3/1988 | Kiesel | 360/14.3 |
| 4,857,816 | 8/1989 | Rogozinski et al. | 318/630 X |
| 4,937,685 | 6/1990 | Barker et al. | 360/14.1 |
| 4,939,594 | 7/1990 | Moxon et al. | 360/14.1 |
| 4,943,866 | 7/1990 | Barker et al. | 358/335 |
| 4,949,193 | 8/1990 | Kiesel | 360/14.1 |
| 4,961,038 | 10/1990 | MacMinn | 318/696 X |
| 4,964,004 | 10/1990 | Barker | 360/14.1 |
| 4,979,050 | 12/1990 | Westland et al. | 360/14.1 |
| 5,103,404 | 4/1992 | McIntosh | 318/568.22 |

Primary Examiner—William M. Shoop, Jr.
Assistant Examiner—David Martin
Attorney, Agent, or Firm—Weingarten, Schurgin, Gagnebin & Hayes

[57] ABSTRACT

An actuator having electronically controllable tactile responsiveness which is flexibly programmable to facilitate provision in a single actuator of torque-position characteristics, such as a selectable number of detents per actuation through its full operative path. A rotary actuator facilitates provision in a single actuator, of torque versus angular position characteristics, such as a selectable number of detents per revolution. The actuator is in communication with a servo motor having a position encoder which outputs position information to a controller that has access to torque-position relation information. The controller outputs a digital torque signal, in accordance with the torque-position relation information, which is converted to an analog current signal applied to the servo motor to generate torque in the servo motor. The torque, presenting a tactile response to a human interacting with the actuator, is sensed as a detent or a plurality of detents.

18 Claims, 6 Drawing Sheets

ACTUATOR HAVING ELECTRONICALLY CONTROLLABLE TACTILE RESPONSIVENESS

FIELD OF THE INVENTION

The present invention relates to actuators and in particular to actuators providing tactile feedback and having programmable torque-position profiles.

BACKGROUND OF THE INVENTION

In numerous contexts humans perform tasks by interacting with machines via actuators having knobs or dials. Such human interaction in many instances becomes conditioned upon the responsiveness of the actuator. The human operator interacts in accordance with tactile feedback perceived through contact with the actuator knobs or dials.

For example, in video or film editing using systems as described in U.S. Pat. Nos. 4,937,685 and 4,964,004 which are incorporated herein by reference, an editor edits video image information at a console having a plurality of "control wheels" (i.e. large dials or knobs). The film or video editor controls operation of a composition system from an operator's console, as illustrated in FIG. 1, using two sets of controls, one for each hand, to control the editing process. Each control set includes a plurality of finger switches or pushbuttons 110 clustered proximate to a large rotatable control wheel 112, facilitating tactile operation with minimal hand movement. As the editor is focussing on at least one video monitor, viewing frames of visual source material during the editing function, it is generally the case that the operator will acquire a feel for the various controls and become acclimated to their functionality through tactile feedback therefrom, rather than having to look at the control wheel(s) for visual feedback. Accordingly, more efficient human interaction with, and sensitivity to the composition system is achieved.

The control wheels 112 exhibit tactile responsiveness, such as detents or clicks, as they are rotated. Typically, a full rotation of the wheel 112 is correlated to a unit of time, such as one second, of viewing the visual source material being edited. A corresponding number of "frames" of visual source material will be viewed during such a time period, depending on the medium or type of source material being edited. It is most desirable that the number of frames of source material be correlated to the tactile responsiveness, i.e. number of clicks, of the wheel 12 during rotation. For instance, film editing involves standardized source material of which twenty-four (24) frames are provided per second. Thus, it is most desirable that in a full rotation of the wheel 112 (presenting one second of source material), the wheel respond with twenty-four (24) clicks, each click corresponding to one frame of the visual source material.

While film editing involves source material having twenty-four (24) frames per second, other video medium standards require different frame rates. The frame rate, or number of frames per second according to the National Television System Committee (NTSC) is thirty (30) frames per second, a standard promulgated for television video in the United States. Standards such as PAL and SECAM provide for a standard frame rate of twenty-five (25) frames per second in England and France respectively. New standards for high definition television specify a frame rate of thirty (30) or sixty (60) frames per second.

Differing frame rate standards relating to visual source material and the nature of mechanical detents in actuators, presents the problem that multiple actuators are required to facilitate correlation between actuator tactile responsiveness and the various visual source material standards. As illustrated in FIG. 1a, actuators known in the art for providing tactile responsiveness typically incorporate a mechanical detent mechanism. A fixed number of clicks is provided by a spring loaded friction mechanism 111 coacting with a sprocket 113 having a fixed number of cogs or detents corresponding to the desired number of clicks per revolution. Therefore, an actuator having twenty-four fixed detents is required and dedicated for a film editing context, a thirty detent actuator is required for a NTSC video editing system, a twenty five detent actuator is required in the PAL or CCAM video editing context, etc. The plurality of actuators required limits the flexibility of visual source material composition systems and significantly increases the complexity, cost and hardware requirements of a flexible system.

In addition to the lack of flexibility of use of fixed mechanical detent actuators, such actuators disadvantageously become worn and suffer tactile responsiveness degradation over time.

SUMMARY OF THE INVENTION

The present invention provides an actuator having electronically controllable tactile responsiveness which is flexibly programmable to facilitate provision in a single actuator of torque-position characteristics, such as a selectable number of detents per actuation through its full operative path. In an illustrative case of a rotary actuator the present invention facilitates provision in a single actuator, of torque versus angular position characteristics, such as a selectable number of detents per revolution.

According to the invention, an actuator is in communication with a servo motor having a position encoder which outputs position information to a controller that has access to torque-position relation information. The output of the controller is a digital torque signal, in accordance with the torque-position relation information, which is converted to an analog current signal applied to the servo motor to generate torque in the servo motor. The torque, presenting a tactile response to a human interacting with the actuator, is sensed as a detent or a plurality of detents.

In further accord with the invention, the controller is a microprocessor which receives position information, from the encoder, through a counter as a position count. Torque-position relation information is stored in microprocessor accessible firmware as a table containing a series of particular torque values corresponding to a series of particular position values. The torque values, output as digital signals and converted by a digital to analog converter, can be modified in accordance with a plurality of stored torque versus position tables to facilitate flexible programming of various torque profiles.

Features of the invention include the capacity to store and modify torque profiles and to select one of a predetermined set of torque profiles to provide an actuator with a desired tactile responsiveness. The torque profiles, stored for example, in electrically erasable programmable read only memory can be changed via a computer in communication with the microprocessor.

Upon system power down and subsequent power up, a previously entered torque profile can be present as a default profile.

DESCRIPTION OF THE DRAWING

These and other features and advantages of the present invention will become more apparent in view of the following detailed description in conjunction with the accompanying drawing, of which.

DETAILED DESCRIPTION OF AN ILLUSTRATIVE EMBODIMENT

Figure 1:
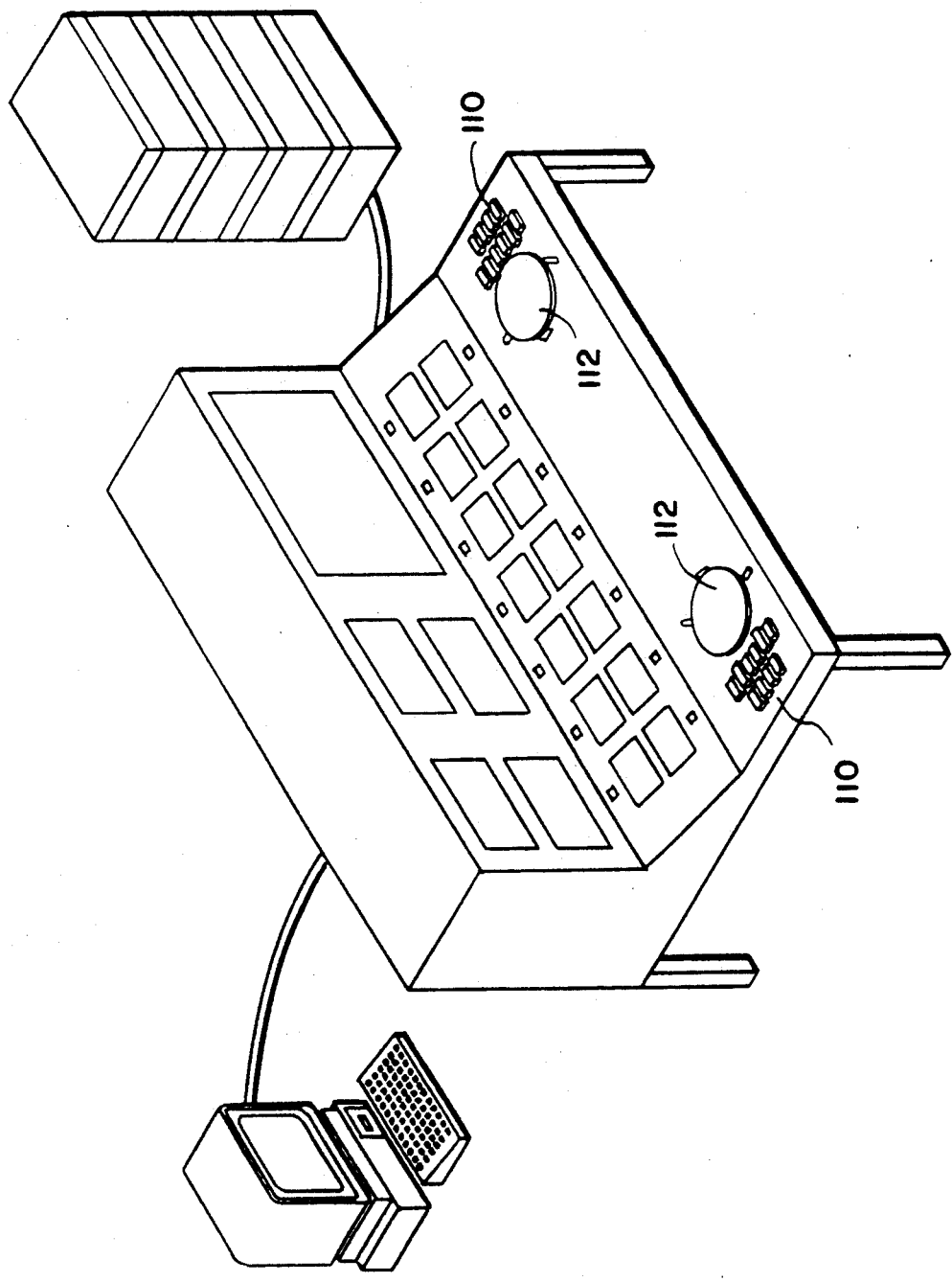
FIG. 1 is an illustration of an operator's console for editing visual source material in a composition system.
Figure 1A:
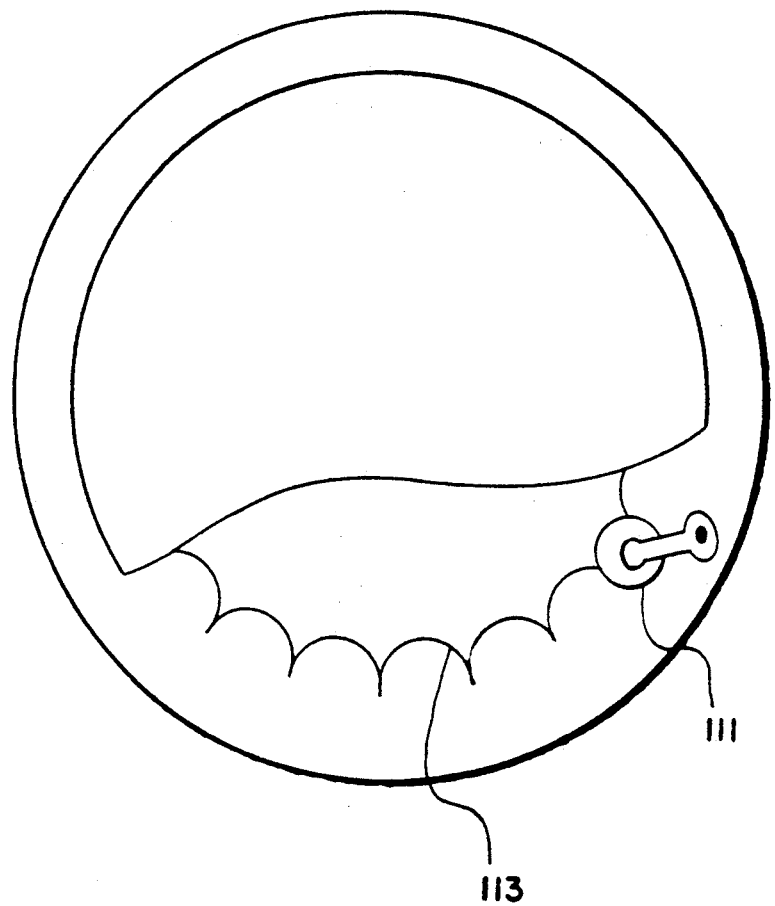
FIG. 1a is a partially broken-away view of an actuator according to the prior art having mechanical detents.
Figure 2:
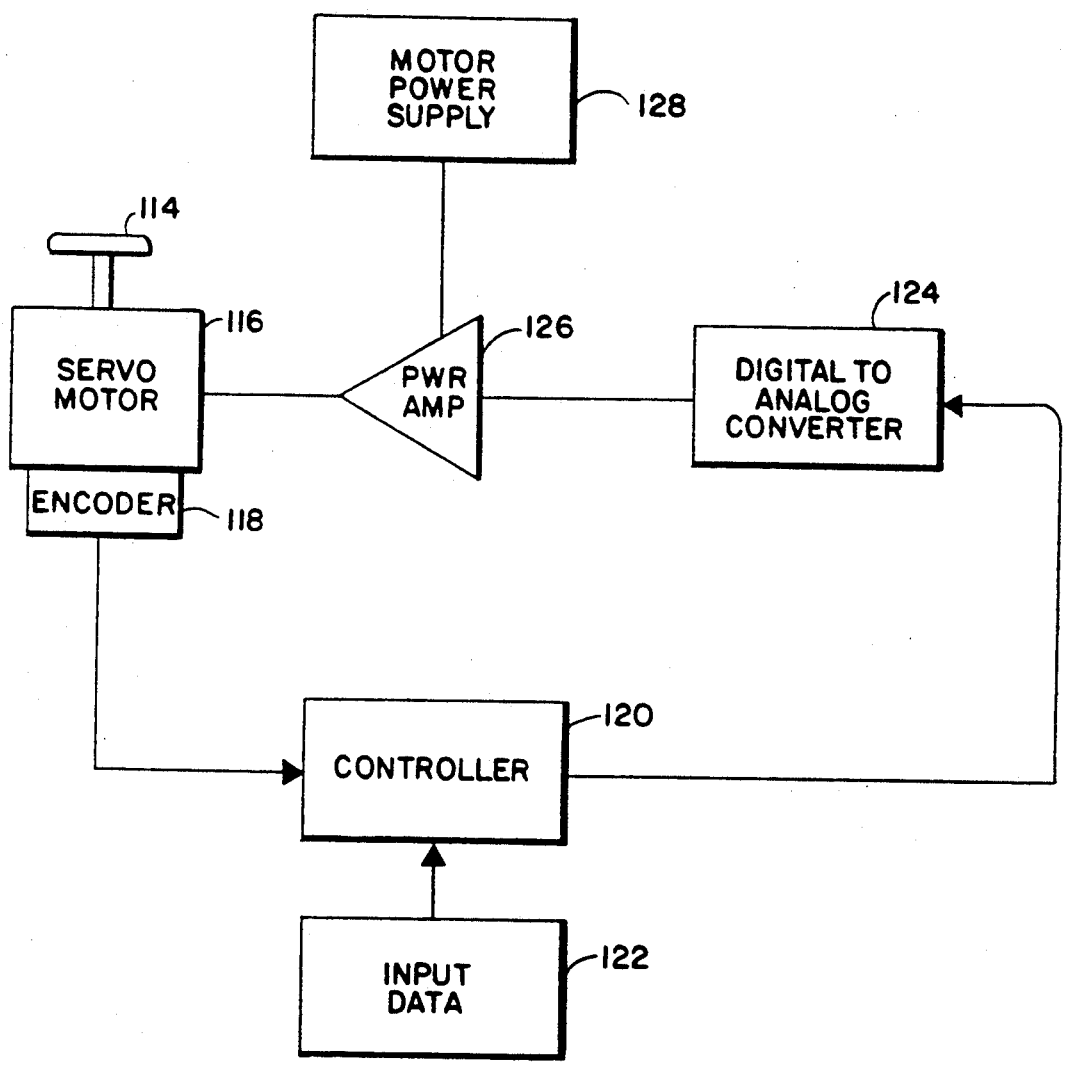
FIG. 2 is a block diagram of a system for providing programmable tactile feedback in an actuator.

Referring now to FIG. 2, an actuator, such as a rotary actuator having a control knob 114 is attached via a shaft to a servo motor 116. In this illustrative embodiment wherein the actuator is for use in a film/video editing context, the servo motor is a PMI 12FVS motor. In the present application, as discussed in greater detail hereinafter, the servo motor is not used as a motor per se, but rather as a torque controller. The motor never runs at a significant amount of its rated revolutions per minute, but operates normally in this application in a stalled or semi-stalled state. The preferred motor 116 has an installed encoder 118. The encoder 118 is a pMI M23, 300 segment modular encoder having an index and providing 300 cycles per revolution, which results in 1200 waveform edges from index to index. Note that in this illustrative embodiment it is important that the encoder be selected to provide a number of edges which is divisible by factors of two, three, five and eight. Thus, position information can be electronically divided to provide an integer number of clicks in selectable modes of 24, 25 and 30 positions per revolution (corresponding to the film/video editing standards of 24, 25 and 30 frames per second or revolution, as discussed hereinbefore).

The position information received from the encoder 118 is processed by a controller 120 so that it represents a positional count. The controller 120 accesses stored input data 122 in the form of torque-position relation information which correlates a received position count with a related torque value As noted hereinbefore, the position count, which is a function of encoder output information, can be derived by electronically dividing position information provided by the encoder waveform, as desired into a selected number of positions or position values. The input data 122 accessed by the controller 120 will have stored torque values associated with the selected position values as provided in accordance with the desired torque profile. The controller 120 outputs the torque value as a digital signal which is converted by a latchable digital to analog converter 124 to an analog voltage. As a voltage applied to the motor would result in a proportional motor speed, the analog voltage is related to motor torque by generating a proportional motor current using a power amplifier 126 in conjunction with a motor power supply 128. The torque related current is applied to the motor 116 to present the desired torque which imparts the desired tactile responsiveness to the control knob 114.

Figure 3:
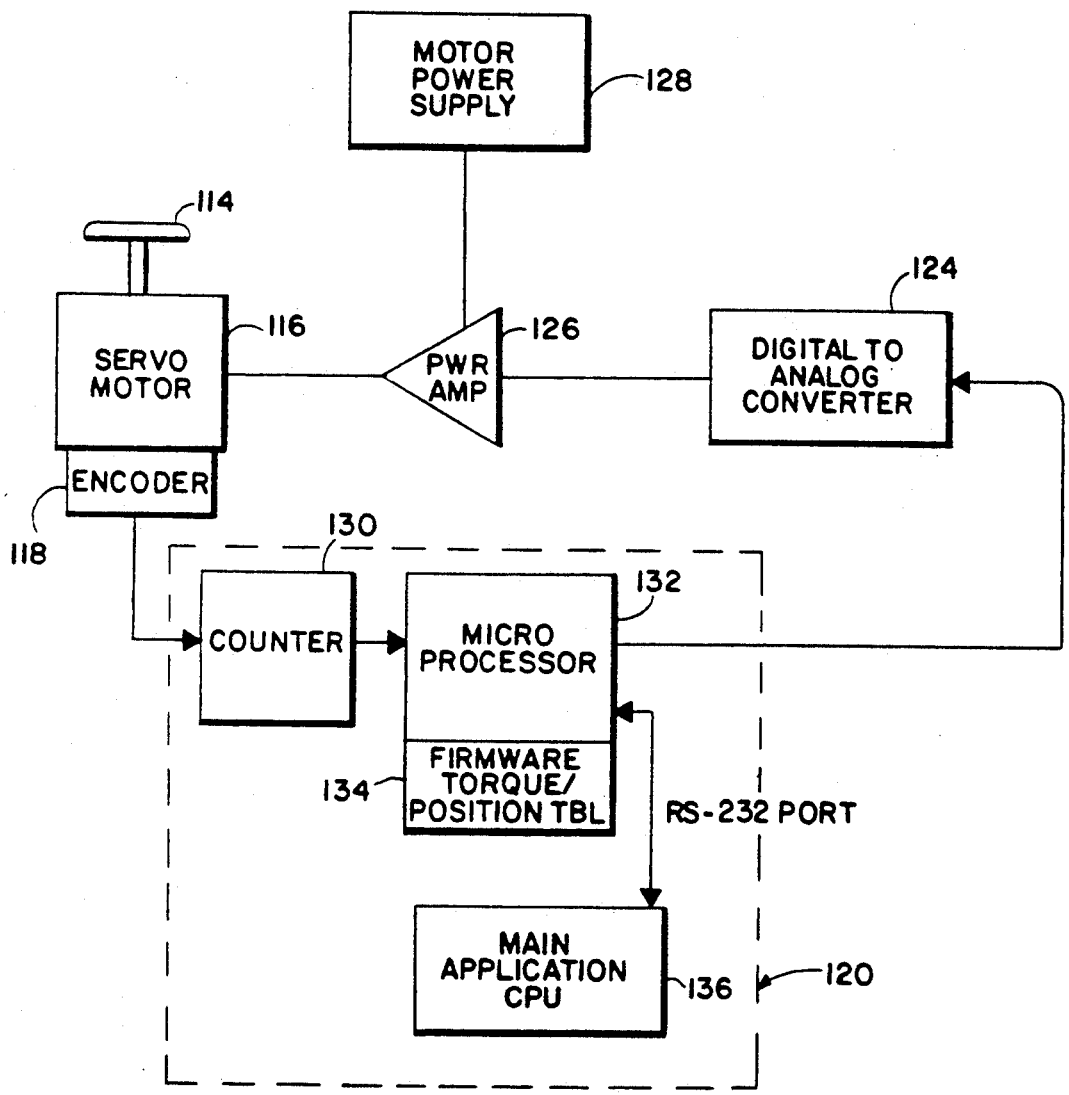
FIG. 3 is a block diagram of a system for providing programmable tactile feedback in an actuator, wherein the controller comprises a counter, microprocessor and accessible firmware.

In an embodiment illustrated in FIG. 3, the controller 120 comprises a counter 130 which receives the servo motor position information from the encoder 118. A microprocessor 132, such as a Motorola 6809, receives a position count from the counter 130 providing an indication of servo motor position relative to the index. The count provided by the counter will increment or decrement depending on the direction of the change of position of the servo motor. The microprocessor accesses electrically erasable programmable read only memory 134 (EEPROM) which is programmed with one or more tables of torque-position relation information. Each table defines a particular torque profile specifying a torque value corresponding to a particular position count (i.e. knob/servo motor position).

Figure 3A:
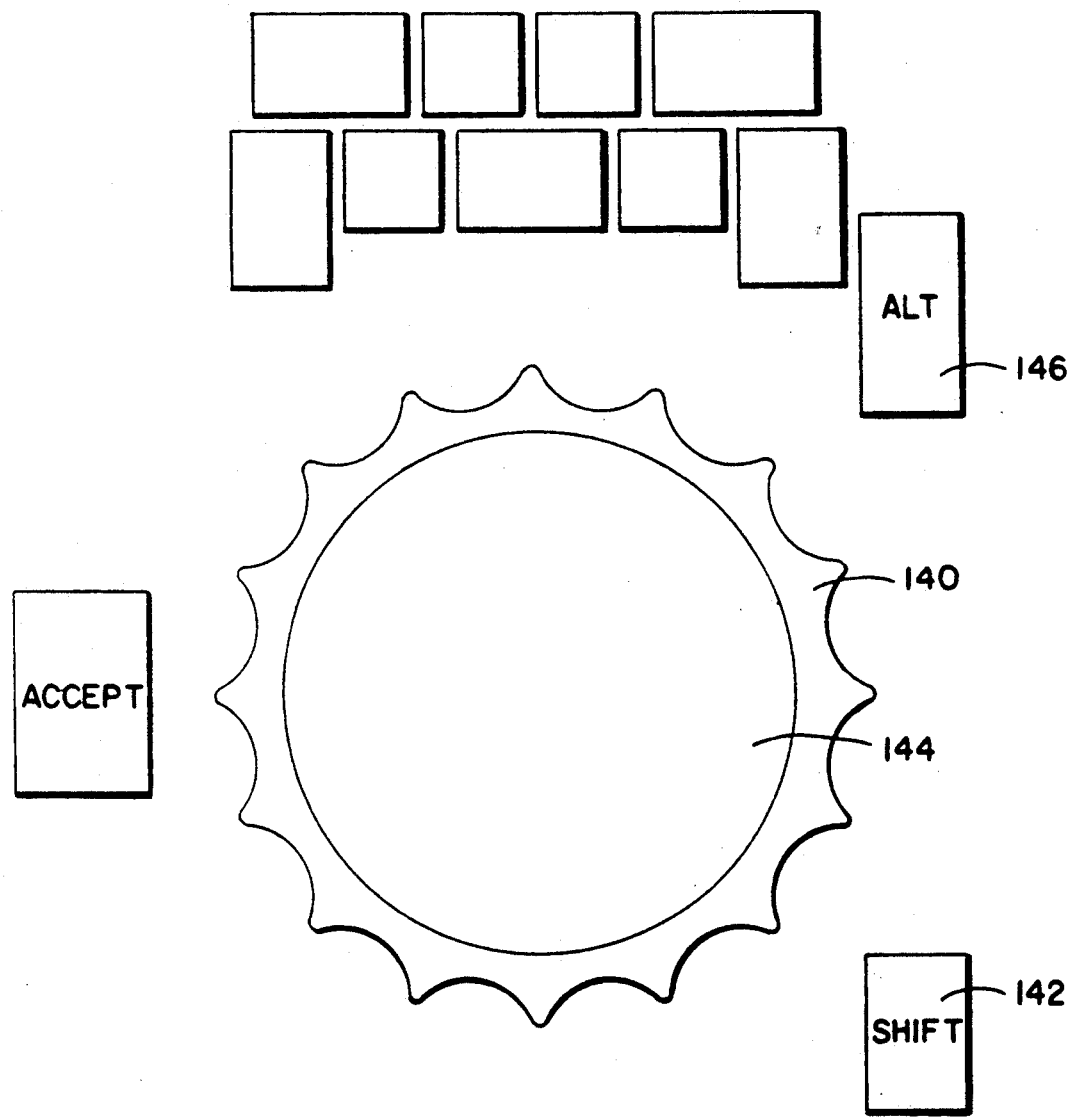
FIG. 3a is an illustrative diagram of an actuator and associated function keys for controlling multiple functions and providing multiple tactile responses in accordance with the selected function.

A main application CPU 136 runs an application which requires and defines particular torque profiles for the actuator 114. The main application CPU may run an application which defines the functionality of a control wheel and related function buttons as illustrated in FIG. 3a. In this illustrative embodiment the control wheel has an outer dial 140 which according to the application performs a first function having a fixed number of positions, such as selecting one of a plurality of switch settings. The application can assign a second function to the same outer dial 140 and provide a profile assigning an alternative responsiveness to the outer dial actuator, such as assigning a lever control function having electronically defined stop positions, when a shift key 142 is depressed. An inner control knob 144 similarly can be assigned a first function and corresponding torque profile (such as a free running non-detent scan function), by the application running on the main application CPU, and a second (or other) function and corresponding torque profile (such as a 30 detent per rotation edit mode, as discussed hereinbefore), which is invoked such as by depressing an alt key 146.

The main application CPU 136, upon application initialization, down loads the desired torque profiles to the microprocessor accessible EEPROM, via an RS-232 serial, or other communication port. The desired torque profiles reside in EEPROM and are selectable via the microprocessor for providing the desired torque at the appropriate actuator position(s) in accordance with the requirements of the main application. A desired torque profile can be selected by a user operating the control knob 144 or outer dial 140 actuators, alone or with other control functions such as the alt or shift keys, to be responsive in accordance with the first or second function. A change in actuator function, and a corresponding change in actuator responsiveness (i.e. torque profile) can be effected via selected key strokes, such as a shift key or function key implementation discussed.

The EEPROM resident tables will not change until a new set of profiles is programmed, i.e down loaded, into the microprocessor accessible memory. Thus, when the system is powered down and subsequently powered up, the previously selected torque profile is resident and available as a default mode for the respective actuators.

Figure 4:
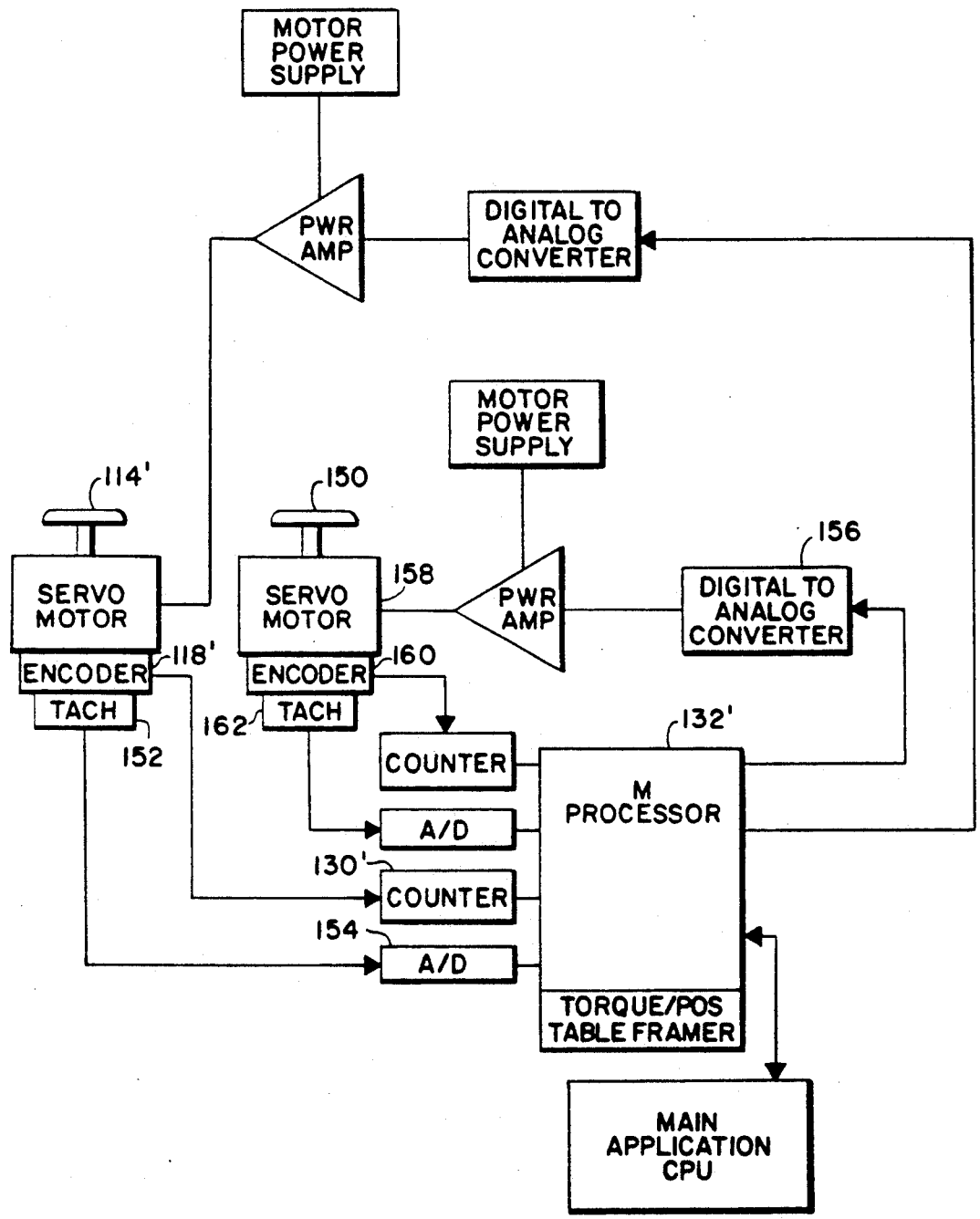
FIG. 4 is a block diagram of a system for providing programmable tactile feedback in an actuator, wherein the system further includes a tachometer sensing motor actuation to generate a corresponding actuation in an associated actuator.

As illustrated in FIG. 4, the selectable torque profiles and tactile responsiveness of the actuator according to the invention can be implemented so that a second actuator 150 is responsive to a first actuator 114', operating substantially as discussed hereinbefore. In certain operations it is desirable to have two actuators working in conjunction according to a common torque profile. In such a case, the servo motor of one actuator can be used to actually drive a second motor, in addition to its function as a torque controller.

For instance, it is desirable when editing film, to turn the first actuator 114' to add one or more frames to one end of the composition material while removing one or the same number of frames from an opposite end of the composition material controlled by the second actuator 150. In such a case, rather than trying to turn the respective control knobs exactly the same amount, it would be best to have the second actuator 150 respond according to the first actuator 114' and its associated torque profile.

As the first actuator 114' is manually rotated N clicks as sensed according to its torque profile implemented as discussed hereinbefore with respect to FIG. 3, the encoder 118' and a tachometer 152 associated with the first actuator 114' indicate the direction and speed, respectively, of the first actuator 114' to the microprocessor 132'. The direction and position of the first actuator 114' is received from the encoder 118, through the counter 130'. The rate of change of position, i.e. velocity, is indicated by the tachometer 152 as an analog signal, which must be converted by an analog to digital converter 154 for processing digitally by the microprocessor 132'. The microprocessor 132', in accordance with the count received from the first actuator 114' and a velocity profile, generates a digital signal which is delivered to the second actuator digital to analog converter 156 and converted to an analog signal, increasing power to a second actuator servo motor 158. The power increase to the second actuator servo motor 158 results in an actuation of the second motor in a direction according to the direction sensed, and according to an operation directed by the microprocessor. The microprocessor monitors a second actuator encoder 160 to read a complementary count from the second actuator 150 being driven, and monitors a second actuator tachometer 162 to sense a velocity comparable to that of the first actuator being manually actuated. When the comparisons indicate that the second actuator is actuated in accordance with the manual actuation of the first actuator, the operation is complete.

While the implementation of a driven actuator describes a tachometer for determining velocity of the actuators, it will be appreciated that velocity can be derived by the microprocessor using a mathematical operation which takes the first derivative of the rate of change of position information, eliminating the need for a tachometer. Further, although a motor power supply is indicated in FIG. 4 for each servo motor, it can be appreciated that a single power supply can be used for both motors.

Although the invention is described herein in the context of an actuator in a film/video editing context, one of ordinary skill in the art will appreciate that selectably programmable tactile responsiveness according to the invention can be provided in many contexts in which mode selection of tactile responsiveness is desirable.

While the actuator having electronically controllable tactile responsiveness is described herein as providing a selectable number of detents or clicks per rotation of a control wheel, it can be appreciated that other torque profiles, such as progressively increasing torque in one direction or another or increasing torque to a point of a pseudo hard stop, can be achieved according to the invention by introducing a torque profile which results in an appropriate current applied to the servo motor.

Further, although programmable tactile responsiveness is described in the context of a rotary actuator application, it will be appreciated that selectable tactile responsiveness can be implemented according to the invention in other applications and actuator contexts, such as in linear actuator contexts.

While various embodiments of the invention illustrated herein describe a main CPU to execute an application program requiring and defining torque profiles for an actuator, and a separate 6809 microprocessor implementing firmware specifying torque-position relationships, one of ordinary skill in the art will appreciate that torque-position relationships can be implemented in the application CPU without the microprocessor or via numerous other microcontrollers. Further, while it is described that the torque profiles are in EEPROM accessible to the microprocessor it will be appreciated that the torque profiles can be stored in microprocessor resident or other storage means, such as ROM, RAM, PALs and the like, and accessed accordingly to implement the desired tactile responsiveness in an actuator.

Although the invention has been shown and described with respect to exemplary embodiments thereof, various other changes, additions and omissions in the form and detail thereof may be made therein without departing from the spirit and scope of the invention.

What is claimed is:

1. An actuator having tactile feedback capabilities, comprising:

a gripping member that is graspable for receiving a tactile feedback;

a servo motor having said gripping member attached thereto;

a position encoder in communication with said servo motor, said encoder having an index representing a reference position of said servo motor and said encoder providing position information of said servo motor relative to said reference position;

a controller receiving said position information from said encoder;

a store of torque-position relation information accessible to said controller, said controller outputting at least one torque value corresponding to said position information in accordance with said store of torque-position relation information; and a drive signal source generating a drive signal to said servo motor in accordance with said at least one torque value, said drive signal causing a torque in said servo motor, said torque providing said tactile feedback to said gripping member.

2. The actuator of claim 1 wherein said gripping member comprises a rotary actuator having a selectable number of detents per revolution.

3. The actuator of claim 1 wherein said gripping member comprises a knob or a dial.

4. The actuator of claim 1 wherein said position encoder is mounted on a shaft integral with said servo motor.

5. The actuator of claim 1 wherein said position encoder generates 300 cycles per revolution of said servo motor.

6. The actuator of claim 5 wherein said 300 cycles per revolution generate 1200 waveform edges which are electronically divisible to provide an integer number of edges for each of selectable modes of 24, 25 and 30 positions per revolution of said servo motor.

7. The actuator of claim 1 further including a counter receiving said position information of said servo motor and providing a count to sequence said controller through said store of torque-position relation information, said controller outputting a digital torque value corresponding to said count in accordance with said store of torque-position relation information.

8. The actuator of claim 7 further including a digital to analog converter receiving said digital torque value and converting said digital torque value to an analog torque signal.

9. The actuator of claim 8 further including a power amplifier receiving said analog torque signal and generating said drive signal to said servo motor in accordance with said at least one torque value, said drive signal being proportional to said analog torque signal.

10. The actuator of claim 1 wherein said controller is a microprocessor receiving said position information on at least one port thereof.

11. The actuator of claim 10 wherein said microprocessor includes resident erasable programmable read only memory which is used for said store of torque-position relation information.

12. The actuator of claim 1 wherein said store of torque-position relation information is at least one table of torque values, each torque value being related to a particular position of said servo motor.

13. The actuator of claim 1 wherein said store of torque-position relation information comprises a plurality of tables of torque values as a function of a plurality of servo motor positions, at least one of said plurality of tables being selectable to provide a torque value relative to a particular position of said servo motor.

14. The actuator of claim 1 wherein said store of torque-position relation information is stored in electrically erasable programmable read only memory.

15. The actuator of claim 1 wherein said store of torque-position relation information selectably provides a torque profile for an actuator having one of 24, 25, 30 and 60 detent positions.

16. The actuator of claim 1 wherein said drive signal source is a current source including a power amplifier and said drive signal is a current provided by said power amplifier.

17. The actuator of claim 1 wherein said store of torque-position relation information includes programmable means for storing at least one torque versus position profile.

18. The actuator of claim 1 further comprising means for determining a rate of change of position of said servo motor and wherein said controller receiving said position information from said encoder further includes means for generating a drive signal to a second servo motor, and means for determining equivalence of said rate of change of position of said servo motor and a rate of change of position of said second servo motor, said controller further including means for determining equivalence of said position information from said encoder and a second position information relating to said second servo motor.

* * * * *